Sept. 10, 1929.                F. T. BOWDITCH                 1,727,462
                        SOLUTION FOR CHEMICAL RECTIFIERS
                              Filed June 21, 1924
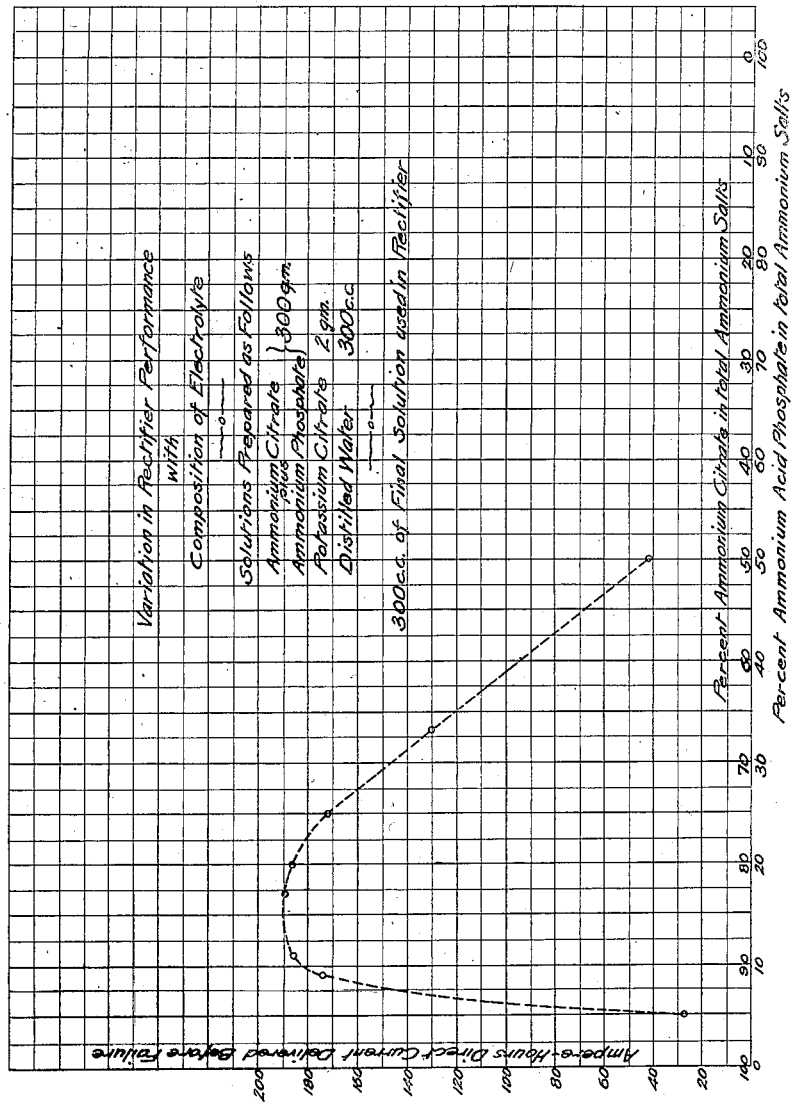
Inventor:
Fred T. Bowditch,
By Byrnes Townsend & Brickenstein
                              Attorneys Patented Sept. 10, 1929.

1,727,462

UNITED STATES PATENT OFFICE.

FRED T. BOWDITCH, OF ELMHURST, NEW YORK, ASSIGNOR TO NATIONAL CARBON COMPANY, INC., A CORPORATION OF NEW YORK.

SOLUTION FOR CHEMICAL RECTIFIERS.

Application filed June 21, 1924. Serial No. 721,545.

The invention relates to the rectification of alternating currents by means of apparatus of the kind usually known as chemical rectifiers, comprising for example aluminum and lead electrodes immersed in a solution adapted to form a film of asymmetrical conductivity on the aluminum. The novelty of the invention resides in an improved solution for the purpose just referred to.

My rectifier solution is essentially an aqueous solution of an ammonium phosphate, such as diammonium hydrogen phosphate, and an ammonium citrate, such as the normal salt, preferably containing also a small quantity of a readily ionizable compound, such as potassium citrate, to increase the conductivity. Ammonium phosphate and citrate are both well-known film-forming agents for rectifier solutions, but I have found that remarkable improvement can be effected by using both the salts in certain proportions in the same solution.

It is a primary object of the present invention to construct a rectifier of minimum volume, which will have a long service life and desirable operating characteristics. I have found that very concentrated solutions of citrate and phosphate must be used to obtain long service from a small volume of solution. Solutions containing not less than 30% of the mixed salts are preferable, and my best results have been obtained with concentrations of about 50%. Stated in terms of the citrate and phosphate radicles, the rectifier solution should contain not less than 20% of the mixed radicles, and preferably about 38%.

I have also found that service life is dependent to a surprising degree upon the relation between the quantities of the salts or their acid radicles in solution.

The attached drawing is a curve which shows the effect of varying the relative quantities of citrate and phosphate. Ordinates on the curve represent total ampere hours of direct current delivered up to the time of failure by a rectifier containing 300 c. c. of solution, while abscissæ are the percentages of ammonium phosphate in the mixture of salts. The total quantity of mixed salts is constant in the test illustrated by the curve, and is equal to the weight of water in the rectifying solution. The solution contains about 0.3% of potassium citrate to increase its conductivity.

It will be observed that when the proportion of phosphate in the salt mixture is small, the service life increases very rapidly with increase in the ammonium phosphate; that the life reaches a maximum when the percentage of phosphate is about 15; and that increasing the phosphate beyond 25% reduces the life rapidly, a mixture of equal weights of the two salts giving but little more than 20% of the life of the optimum mixture.

The effect of proportions of the salts on life is so great when the phosphate is less than 10% of the mixture that I am unable to specify the exact point where the curve begins noticeably to flatten, but it may be safely said that not more than fifteen times as much citrate as phosphate should be used for the best results. The quantity of citrate should be at least three times as great as the quantity of phosphate. The ratio of citrate radicle $C_6H_5O_7$ to phosphate radicle $PO_4$ in solutions giving the longest service will also fall between 3 and 15.

The service life of a rectifier containing a solution such as those described above can also be increased by substituting citric acid for ammonium citrate. The maximum service life plotted on the curve of the drawing is about 190 ampere hours. A solution identical with that which gave this life with the exception that one-half the ammonium citrate was replaced by a quantity of citric acid carrying an equal number of the citrate radicles, gave 206 ampere hours. By replacing all the ammonium citrate of the 190 ampere-hour solution with the equivalent quantity of citric acid, a life of 274 ampere hours was obtained. The resistance of the solution is increased by this substitution, however, and when relatively heavy currents pass through the rectifier, as during the interval before the rectifying film has formed, the rectifier may heat up so much that the water will be boiled out of it, destroying the rectifier. Whether ammonium citrate, citric acid, or a mixture of the two is to be used depends therefore upon the manner in which the rectifier is to be employed.

I claim:

1. A rectifier solution containing citrate and phosphate radicles, the ratio of citrate radicle to phosphate radicle falling between 3 and 15.

2. A rectifier solution containing more than 20% of citrate and phosphate radicles, the ratio of citrate radicle to phosphate radicle falling between 3 and 15.

3. A rectifier solution containing more than 20% of citrate and phosphate radicles, the ratio of citrate radicle to phosphate radicle falling between 3 and 15; the solution containing also an alkali metal compound.

4. A rectifier solution containing ammonium citrate and ammonium phosphate, the ratio of the citrate to the phosphate falling between 3 and 15 and the two salts together being at least 30% of the solution.

5. A rectifier solution containing about 33% of citrate radicle and about 7.5% of ammonium phosphate.

6. A rectifier solution containing about 42.5% of ammonium citrate and about 7.5% of ammonium phosphate.

In testimony whereof, I affix my signature.

FRED T. BOWDITCH.